BEST AVAILABLE COPY

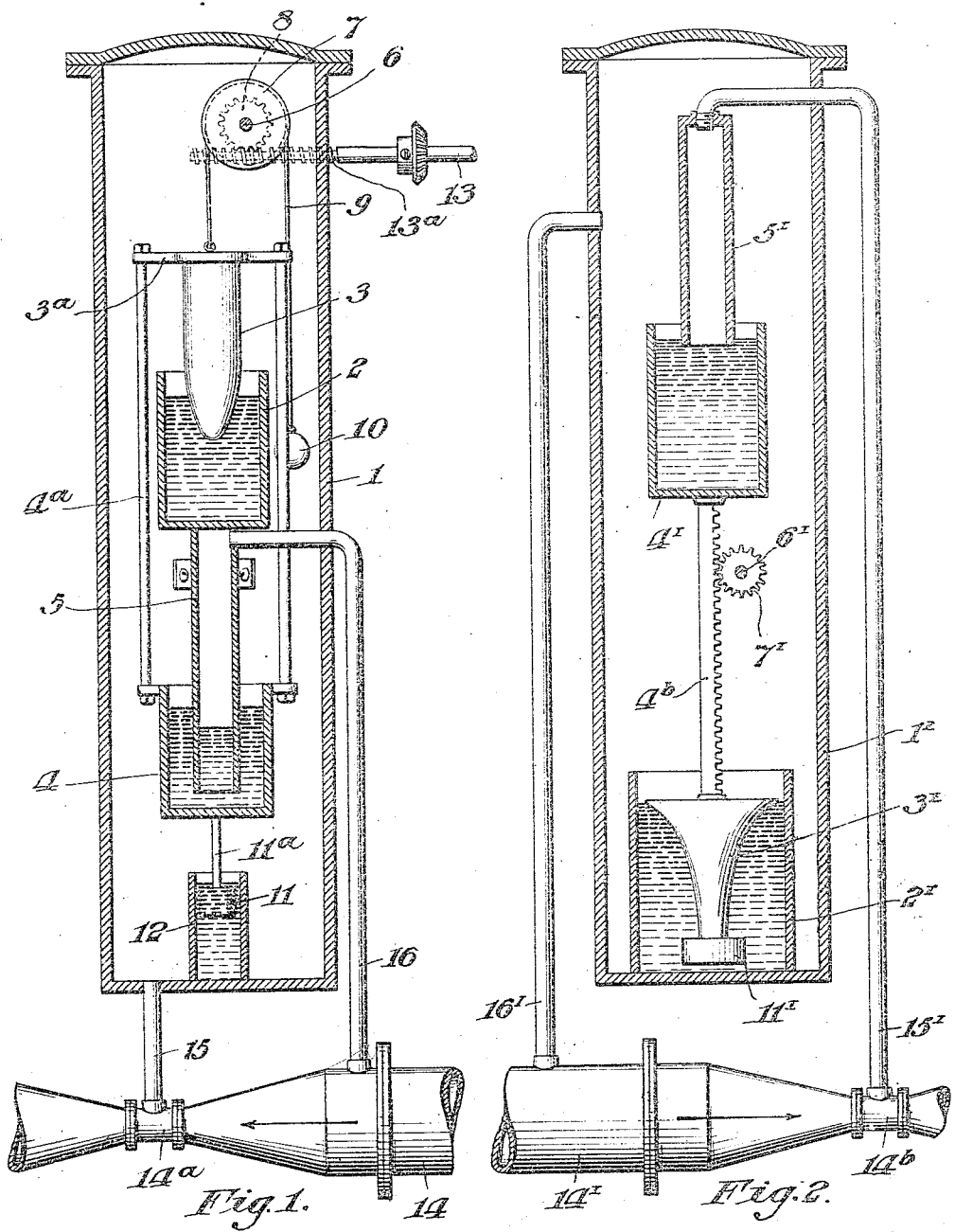

UNITED STATES PATENT OFFICE.

JOHN W. LEDOUX, OF SWARTHMORE, PENNSYLVANIA.

FLUID-METER.

1,135,119.  Specification of Letters Patent.  Patented Apr. 13, 1915.

Application filed June 26, 1912. Serial No. 705,909.

*To all whom it may concern:*

Be it known that I, JOHN W. LEDOUX, a citizen of the United States, residing at Swarthmore, in the county of Delaware and State of Pennsylvania, have invented certain Improvements in Fluid - Meters, of which the following is a specification.

My invention is a fluid meter designed to provide a simple and efficient construction that will operate accurately throughout the range between the minimum and maximum flow.

The characteristics of my improvements are disclosed in the following description and the accompanying drawings in illustration thereof.

In the drawings, Figure 1 is a sectional elevation of a meter embodying my improvements, and Fig. 2 is a sectional elevation of a modified construction of the same.

As illustrated in Fig. 1, a casing or closed chamber 1 contains a stationary vessel 2 having therein a liquid heavier than that to be measured, a tapered displacing device 3 movable in said liquid, a movable vessel 4 containing a liquid heavier than that to be measured, and a stationary tube 5 having its open lower end sealed by the heavier liquid in the vessel 4. The displacing device 3 and the vessel 4 are connected by the cross head 3ª and the rods 4ª. A shaft 6, journaled in the casing, has fixed thereon a sheave 7 and a worm wheel 8. A cord 9 passes from the cross-head 3ª over the sheave 7 to a weight 10 which acts to counterbalance the device 3, vessel 4 and connecting frame 3ª—4ª. A float 11, fixed to the vessel 4 by a rod 11ª, is constantly submerged in a liquid (heavier than that to be measured) contained in the vessel 12, the float acting to counterbalance the weight of the parts 3, 4, 3ª and 4ª. The wheel 8 revolves the register shaft 13 by its engagement with the worm 13ª thereon. A conduit 14, containing a contracted section 14ª, has such contracted section connected with the interior of the casing 1 by the pipe 15 and a larger section connected with the upper end of the tube 5 by the pipe 16.

The device 3 is disposed so that its lower extremity touches the surface of the heavier liquid in the vessel 2 when there is no flow in the conduit 14, at which time the pressures communicated from the liquid in the conduit through the pipes 15 and 16 will be equal, the heavier liquid in the vessel 4 within and without the tube 5 will be at the same level, and the vessel 4 will stand at the upper limit of its movement. As the flow in the conduit 14 rises from zero to the maximum, the gradually increasing difference between the lower pressure communicated through the pipe 15 and the higher pressure communicated through the pipe 16 causes the heavier liquid to be forced downwardly out of the tube 5 and to rise in the vessel 4. As the heavier liquid thus rises in the vessel 4, the latter moves downwardly and carries the displacing device 3 downwardly into the heavier liquid in the vessel 3, whereby the movement of the vessel 4 is controlled, the displacing device increasing from the lower point upwardly in cross-sectional area in such manner that its movement and that of the movable vessel shall maintain a simple ratio to changes in the flow in the conduit 14.

As illustrated in Fig. 2, the casing 1' contains a stationary vessel 2' having therein a liquid heavier than that to be measured, a tapered displacing device 3' movable in said liquid, a movable vessel 4' containing a liquid heavier than that to be measured, a toothed rod or rack 4ᵇ connecting the device 3' with the vessel 4', a tube 5' having its open lower end sealed by the liquid in the vessel 4', a shaft 6' journaled in the casing, and a toothed wheel 7' fixed on the shaft 6' in engagement with the rack 4ᵇ. The device 3' has a float 11' fixed thereto and constantly submerged in the heavier liquid in the vessel 2' to act as a counterbalance for the vessel 4' and connected parts.

The conduit 14', containing the contracted section 14ᵇ, has its contracted section connected by the pipe 15' with the top of the tube 5' and a larger section connected by the pipe 16' with the interior of the casing 1'. When there is no flow in the conduit 14' the pressures communicated from the liquid therein through the pipes 15' and 16' will be equal, the heavier liquid in the vessel 4' within and without the pipe 5' will stand at the same level, and the device 3' will occupy its lowest position of greatest submergence in the vessel 2'. As the flow in the conduit 14' rises from zero to the maximum the difference between the lower pressure communicated through the pipe 15' and the higher pressure communicated through the pipe 16' will gradually increase, the heavier liquid will be driven from the vessel 4' up the tube 5' and this vessel will rise under the influence of the float or displacing device 3', the latter decreasing in cross sectional area from the top downwardly in such manner that its upward movement will bear a simple ratio to changes in the flow in the conduit 14'.

Having described my invention, I claim:—

1. In a fluid meter, the combination of a casing, a vessel movable in said casing, said vessel containing a liquid, a displacing device of variable cross section fixed to said vessel, said casing containing a liquid in which said device is movable, a tube sealed by the liquid in said vessel, and means comprising a conduit having a Venturi section whereby differential pressures are communicated to the surface of the liquid in said vessel within and without said tube.

2. In a fluid meter, the combination of a casing containing a stationary upright receptacle for holding a liquid heavier than the fluid to be measured, a movable upright vessel containing a liquid heavier than the fluid to be measured, a device fixed to said movable vessel and movable in said liquid first named, a stationary duct having an opening in an end thereof sealed by said liquid in said vessel, a conduit for conveying the fluid to be measured, and means whereby the pressures of fluid flowing in said conduit are differentiated and the differential pressures communicated to the surface of the liquid in said vessel within and exterior to said duct, said device being tapered so as to be movable in a simple ratio to changes in the flow to be measured.

3. In a fluid meter, the combination of a casing containing a liquid heavier than the fluid to be measured, a movable upright vessel containing a liquid heavier than the fluid to be measured, a displacing device of variable cross section fixed to said vessel and movable in said liquid first named, a duct having an opening sealed by said liquid in said vessel, a conduit and means whereby the pressures of fluid flowing in said conduit are differentiated and the differentiated pressures communicated to the surface of said liquid in said vessel interior and exterior to said duct, said displacing device being shaped so as to regulate the movement of said vessel to a simple proportion to changes in the flow in said conduit.

4. In a fluid meter, a casing containing a receptacle having therein a liquid heavier than the fluid to be measured, a displacing device of variable cross section movable in said liquid, a movable upright vessel containing a liquid heavier than the fluid to be measured, means comprising a rod connecting said displacing device and vessel whereby they are movable as a unit, a stationary tube having an opening sealed by said liquid in said vessel, a conduit having a contracted section for carrying a fluid to be measured and pipes connecting said contracted section and a different section of said conduit with the interior of said casing within and without said tube, said displacing device being shaped so that the movement of said vessel is regulated to a constant relation to changes of flow in said conduit.

In testimony whereof, I have hereunto set my name this 24th day of June, 1912.

J. W. LEDOUX.

Witnesses:
 Jos. G. Denny, Jr.,
 C. N. Butler.